United States Patent

McConkey

[11] Patent Number: 5,912,370
[45] Date of Patent: Jun. 15, 1999

[54] EMISSION FILTER

[76] Inventor: James H. McConkey, 15 Hall Rule Drive, Cardonald, Glasgow, United Kingdom, G52 2HH

[21] Appl. No.: 09/022,399

[22] Filed: Feb. 12, 1998

[51] Int. Cl.⁶ ................................................. B01D 50/00
[52] U.S. Cl. ............................ 55/385.3; 55/493; 55/501; 55/505; 55/510; 55/519; 55/DIG. 30
[58] Field of Search ................................ 55/385.1, 385.3, 55/493, 501, 505, 510, 519, DIG. 30

[56] References Cited

U.S. PATENT DOCUMENTS

| | | | |
|---|---|---|---|
| 1,102,053 | 6/1914 | Johnson | 55/505 |
| 2,271,733 | 2/1942 | Clark | 55/505 |
| 2,378,839 | 6/1945 | Ensign et al. | 55/505 |
| 3,675,398 | 7/1972 | Giarrizzo | 55/485 |
| 4,465,238 | 8/1984 | Patel et al. | 55/505 |
| 4,619,672 | 10/1986 | Robertson | 55/505 |
| 5,141,714 | 8/1992 | Obuchi et al. | 55/DIG. 30 |
| 5,294,236 | 3/1994 | Baird | 55/505 |

*Primary Examiner*—Jay H. Woo
*Assistant Examiner*—Minh-Chau T. Pham

[57] ABSTRACT

An emission filter is provided including a tube attachment removably coupled to an exhaust pipe. A filter is mounted on the tube for filtering exhaust emitted from the exhaust pipe.

1 Claim, 4 Drawing Sheets

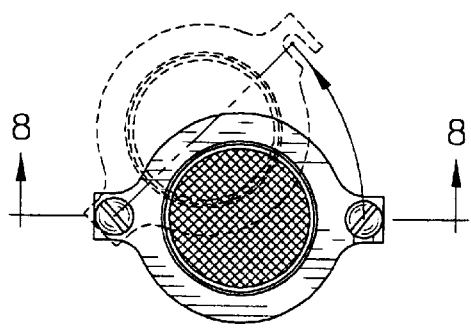
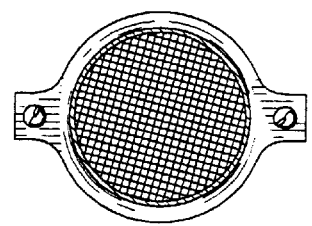
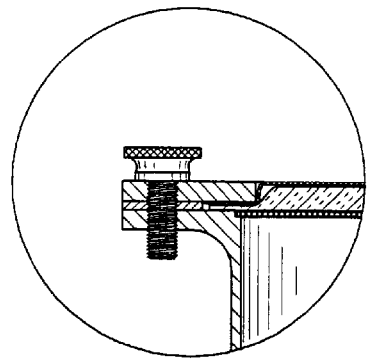
Fig. 7
Fig. 9
Fig. 10
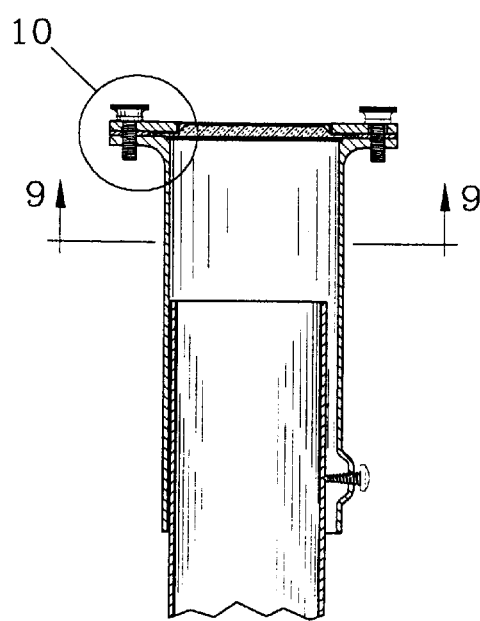
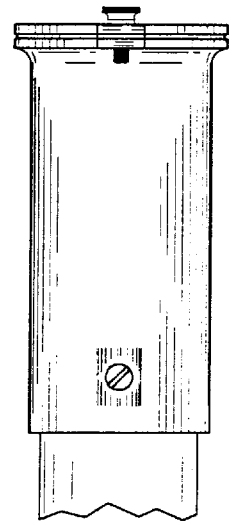
Fig. 8
Fig. 11

EMISSION FILTER

BACKGROUND OF THE INVENTION

1. Field of the Invention

The present invention relates to automotive filters and more particularly pertains to a new emission filter for removably attaching a charcoal filter to an exhaust pipe of a vehicle.

2. Description of the Prior Art

The use of automotive filters is known in the prior art. More specifically, automotive filters heretofore devised and utilized are known to consist basically of familiar, expected and obvious structural configurations, notwithstanding the myriad of designs encompassed by the crowded prior art which have been developed for the fulfillment of countless objectives and requirements.

Known prior art automotive filters include U.S. Pat. No. 4,282,186; U.S. Pat. No. 5,135,551; U.S. Pat. No. Des. 269,294; U.S. Pat. No. 4,628,689; U.S. Pat. No. 5,400,590; and U.S. Pat. No. 4,301,652.

In these respects, the emission filter according to the present invention substantially departs from the conventional concepts and designs of the prior art, and in so doing provides an apparatus primarily developed for the purpose of removably attaching a charcoal filter to an exhaust pipe of a vehicle.

SUMMARY OF THE INVENTION

In view of the foregoing disadvantages inherent in the known types of automotive filters now present in the prior art, the present invention provides a new emission filter construction wherein the same can be utilized for removably attaching a charcoal filter to an exhaust pipe of a vehicle.

The general purpose of the present invention, which will be described subsequently in greater detail, is to provide a new emission filter apparatus and method which has many of the advantages of the automotive filters mentioned heretofore and many novel features that result in a new emission filter which is not anticipated, rendered obvious, suggested, or even implied by any of the prior art automotive filters, either alone or in any combination thereof.

To attain this, the present invention generally comprises a rigid tube attachment having a hollow cylindrical configuration with an inboard open face, an outboard open face and a periphery formed therebetween. The outboard open face has an annular flange coupled to a periphery thereof and extending radially therefrom. A pair of planar tabs are integrally coupled to diametrically opposed points on an outer periphery of the annular flange. The tabs extend radially from the annular flange with each tab having a threaded bore formed therein. An indent with a square configuration is formed in the periphery of the tube adjacent to the inboard open face. The indent as a threaded aperture formed therein for screwably receiving a set screw. Such screw serves for coupling the tube to an end of an exhaust pipe of a vehicle. Also included is a first wire mesh having a circular thin planar configuration with a thickness less than ½ that of the annular flange of the tube. The first wire mesh is mounted within an annular indentation formed in an outer surface of the annular flange of the tube. As shown in FIG. 10, an outer surface of the wire mesh is in coplanar relationship with that of the annular flange. A shown in FIG. 13, a containment ring is provided having an annular configuration. A pair of tabs are integrally coupled to diametrically opposed points of an outer periphery of the containment ring and extend radially therefrom. A first one of the tabs has a circular bore formed therein. A second one of the tabs has a horizontal slot formed therein. Associated therewith is a second wire mesh having a circular thin planar configuration with a thickness less than ½ that of the annular flange of the tube. A periphery of the second wire mesh is mounted to an inner surface of the annular flange of the tube. As shown in FIG. 10, a central extent of the wire mesh is bent such that an outer surface thereof is in coplanar relationship with that of the containment ring for reasons that will soon become apparent. A pair of set screws are included for pivotally coupling one of the tabs of the containment ring to that of the annular flange of the tube. Such set screws further function to allow the releasably securement of another one of the tabs of the containment ring to that of the annular flange of the tube. Finally, a charcoal filter has a circular planar configuration with a thickness equal to that of the annular flange of the tube. The charcoal filter is removably secured between the containment ring and the annular flange of the tube for filtering exhaust emitted from the exhaust pipe.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new emission filter apparatus and method which has many of the advantages of the automotive filters mentioned heretofore and many novel features that result in a new emission filter which is not anticipated, rendered obvious, suggested, or even implied by any of the prior art automotive filters, either alone or in any combination thereof.

It is another object of the present invention to provide a new emission filter which may be easily and efficiently manufactured and marketed.

It is a further object of the present invention to provide a new emission filter which is of a durable and reliable construction.

An even further object of the present invention is to provide a new emission filter which is susceptible of a low cost of manufacture with regard to both materials and labor, and which accordingly is then susceptible of low prices of sale to the consuming public, thereby making such emission filter economically available to the buying public.

Still yet another object of the present invention is to provide a new emission filter which provides in the apparatuses and methods of the prior art some of the advantages thereof, while simultaneously overcoming some of the disadvantages normally associated therewith.

Still another object of the present invention is to provide a new emission filter for removably attaching a charcoal filter to an exhaust pipe of a vehicle.

Even still another object of the present invention is to provide a new emission filter that includes a tube attachment removably coupled to an exhaust pipe. A filter is mounted on the tube for filtering exhaust emitted from the exhaust pipe.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a top view of the present invention.

FIG. 8 is a side cross-sectional view of the present invention taken along line 8—8 shown in FIG. 7.

FIG. 9 is a top view of the present invention with one-way screws being utilized.

FIG. 10 is a detailed cross-sectional view of the present invention shown in FIG. 9.

FIG. 11 is a side view of the present invention.

DESCRIPTION OF THE PREFERRED EMBODIMENT

Figure 2:
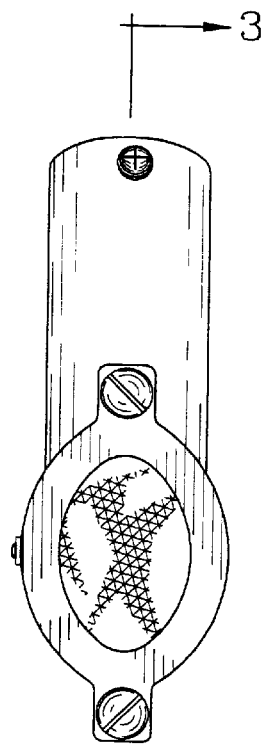
FIGS. 1–6 shown an alternate configuration of the present invention.
Figure 3:
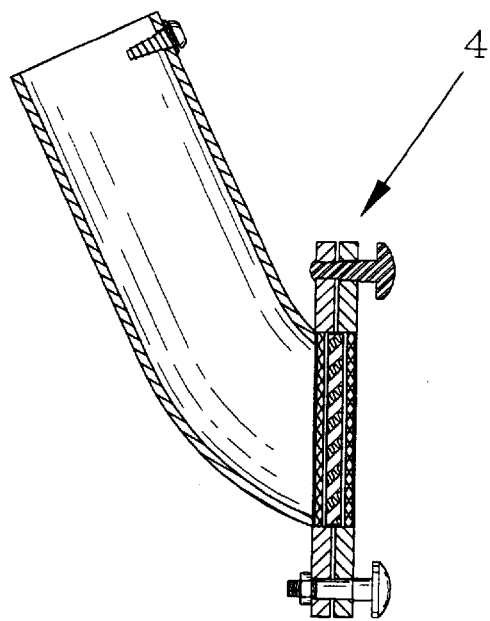
Figure 1:
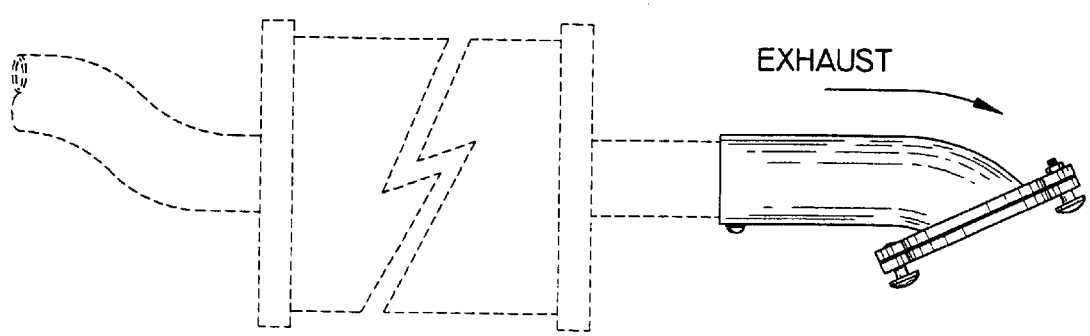
Figure 4:
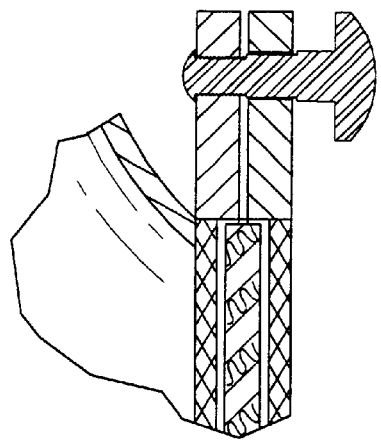
Figures 5, 6:
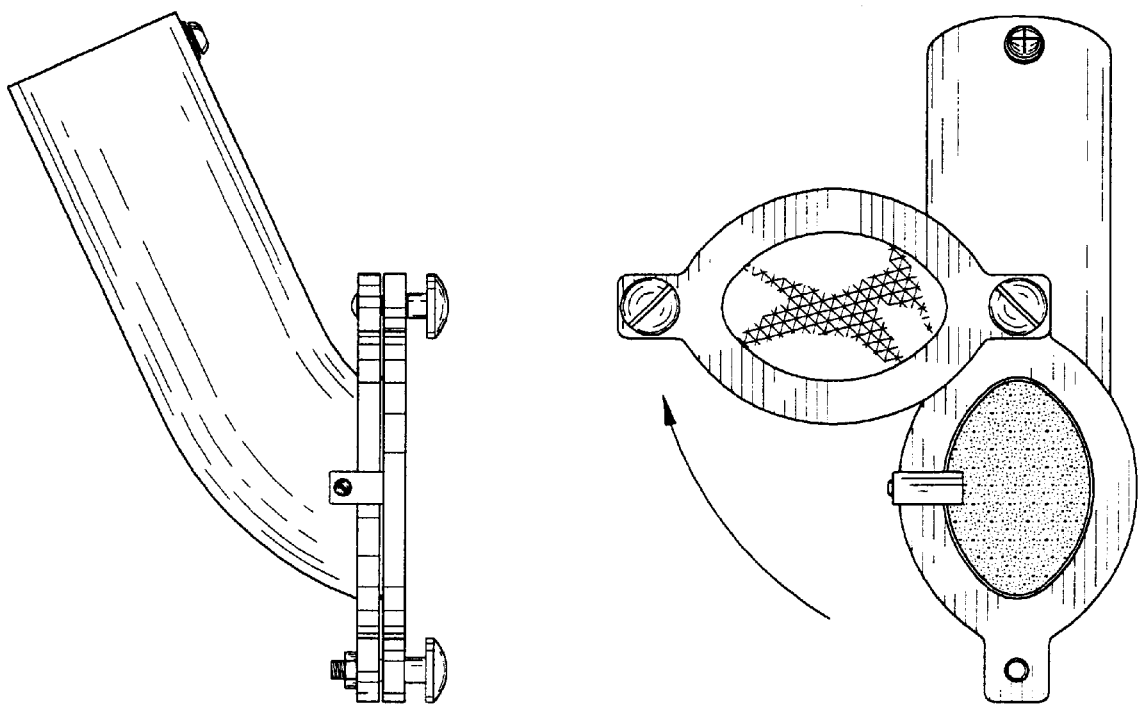
Figure 12:
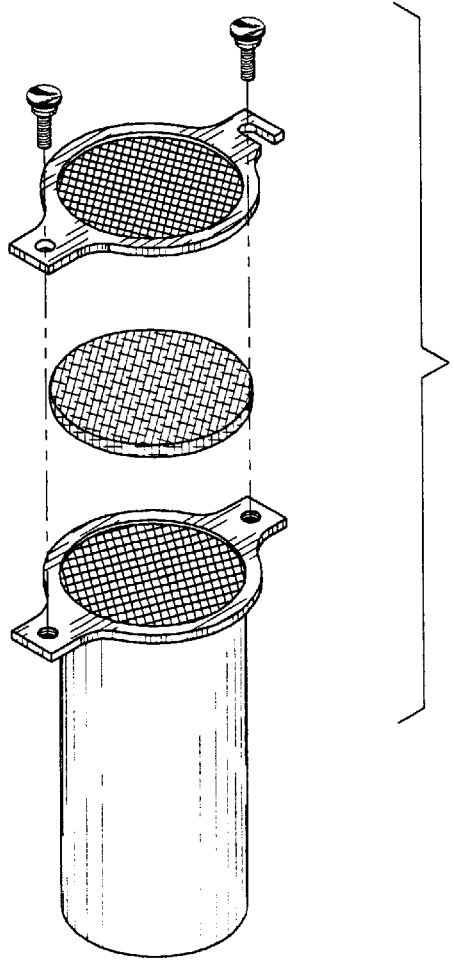
FIG. 12 is a partial exploded view of the present invention.

With reference now to the drawings, and in particular to FIGS. 1 through 13 thereof, a new emission filter embodying the principles and concepts of the present invention and generally designated by the reference numeral 10 will be described.

The present invention, designated as numeral 10, includes a rigid tube 12 attachment having a hollow cylindrical configuration with an inboard open face, an outboard open face and a periphery formed therebetween. The outboard open face has an annular flange 14 coupled to a periphery thereof and extending radially therefrom. A pair of planar tabs 16 are integrally coupled to diametrically opposed points on an outer periphery of the annular flange. The tabs extend radially from the annular flange with each tab having a threaded bore formed therein. In an alternate embodiment 17, a periphery of the outboard open face may reside within a plane with a normal offset from an axis of the tube. In such embodiment, the outboard open face is oval shaped. Note FIGS. 1–6.

An indent 18 with a square configuration is formed in the periphery of the tube adjacent to the inboard open face. The indent as a threaded aperture formed therein for screwably receiving a set screw 20. Such screw serves for coupling the tube to an end of an exhaust pipe of a vehicle.

Also included is a first wire mesh 22 having a circular thin planar configuration with a thickness less than ½ that of the annular flange of the tube. The first wire mesh is mounted within an annular indentation formed in an outer surface of the annular flange of the tube. As shown in FIG. 10, an outer surface of the wire mesh is in coplanar relationship with that of the annular flange.

Figure 13:
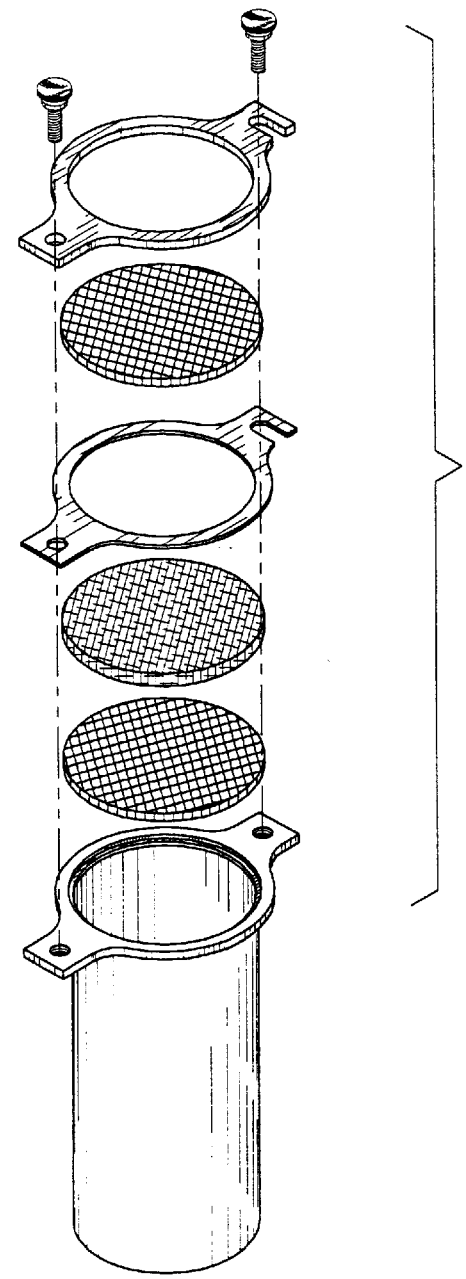
FIG. 13 is a full exploded view of the present invention.

As shown in FIG. 13, a containment ring 24 is provided having an annular configuration. Similar to the containment ring, a pair of tabs are integrally coupled to diametrically opposed points of an outer periphery of the containment ring and extend radially therefrom. A first one of the tabs has a circular bore 26 formed therein. A second one of the tabs has a horizontal slot 28 formed therein. The horizontal slot resides along a tangent of a circle whose center is coincident with that of the containment ring. As an option, one-way screws may be employed to secure the containment ring. Note FIG. 9.

Associated therewith is a second wire mesh 30 having a circular thin planar configuration with a thickness less than ½ that of the annular flange of the tube. A periphery of the second wire mesh is mounted to an inner surface of the annular flange of the tube. As shown in FIG. 10, a central extent of the wire mesh is bent such that an outer surface thereof is in coplanar relationship with that of the containment ring to define a disk-shaped compartment for reasons that will soon become apparent.

A pair of set screws 32 are included for pivotally coupling one of the tabs of the containment ring to that of the annular flange of the tube. In use, the containment ring pivots within generally the same plane in which the annular flange resides. Such set screws further function to allow the releasably securement of another one of the tabs of the containment ring to that of the annular flange of the tube.

Finally, a carbon or charcoal filter 34 has a circular planar configuration with a thickness equal to that of the annular flange of the tube. The charcoal filter is removably secured between the containment ring and the annular flange of the tube for filtering exhaust emitted from the exhaust pipe. As shown in FIG. 10, a periphery of the filter is pinched between the containment ring and the annular flange.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An emission filter comprising, in combination:

a rigid tube attachment having a hollow substantially cylindrical configuration with an inboard open face, an outboard open face and a periphery formed therebetween, the outboard open face having an annular flange coupled to a periphery thereof and extending radially therefrom, a pair of planar tabs integrally coupled to diametrically opposed points on an outer periphery of the annular flange and extending radially therefrom with each tab having a threaded bore formed therein, an indent with a substantially square configuration formed in the periphery of the tube adjacent to the inboard open face, the indent having a threaded aperture formed therein for screwably receiving a set screw adapted for coupling the tube to an end of an exhaust pipe of a vehicle;

a first wire mesh having a substantially circular thin planar configuration with a thickness less than ½ a thickness of the annular flange of the tube, the first wire mesh being mounted within an annular indentation formed in an outer surface of the annular flange of the tube, wherein an outer surface of the wire mesh is in coplanar relationship with the outer surface of the annular flange;

a containment ring having an annular configuration with a pair of tabs integrally coupled to diametrically opposed points of an outer periphery of the containment ring and extending radially therefrom, a first one of the tabs having a substantially circular bore formed therein and a second one of the tabs having a horizontal slot formed therein along a tangent of a circle whose center is coincident with a center of the containment ring;

a second wire mesh having a substantially circular thin planar configuration with a thickness less than ½ the thickness of the annular flange of the tube, wherein a central extent of the wire mesh is bent and positioned within the containment ring such that an outer surface thereof is in coplanar relationship with an outer surface of the containment ring, thereby defining a disk-shaped compartment;

a pair of set screws for pivotally coupling one of the tabs of the containment ring to one of the tabs of the annular flange of the tube and further allowing the releasable securement of another one of the tabs of the containment ring to another one of the tabs of the annular flange of the tube such that the containment ring may be pivoted with respect to the annular flange of the tube; and a charcoal filter having a substantially circular planar configuration with a thickness equal to the thickness of the annular flange of the tube, the charcoal filter being removably secured within the compartment between the containment ring and the annular flange of the tube for filtering exhaust emitted from the exhaust pipe, wherein a periphery of the filter is pinched between the containment ring and the annular flange.

* * * * *